Jan. 13, 1959   S. C. ARGYLE   2,868,066
OPTICAL RECTIFIER

Filed Sept. 9, 1957   2 Sheets-Sheet 1

INVENTOR.
SIDNEY C. ARGYLE

BY
ATTORNEY

Jan. 13, 1959     S. C. ARGYLE     2,868,066
OPTICAL RECTIFIER
Filed Sept. 9, 1957     2 Sheets-Sheet 2
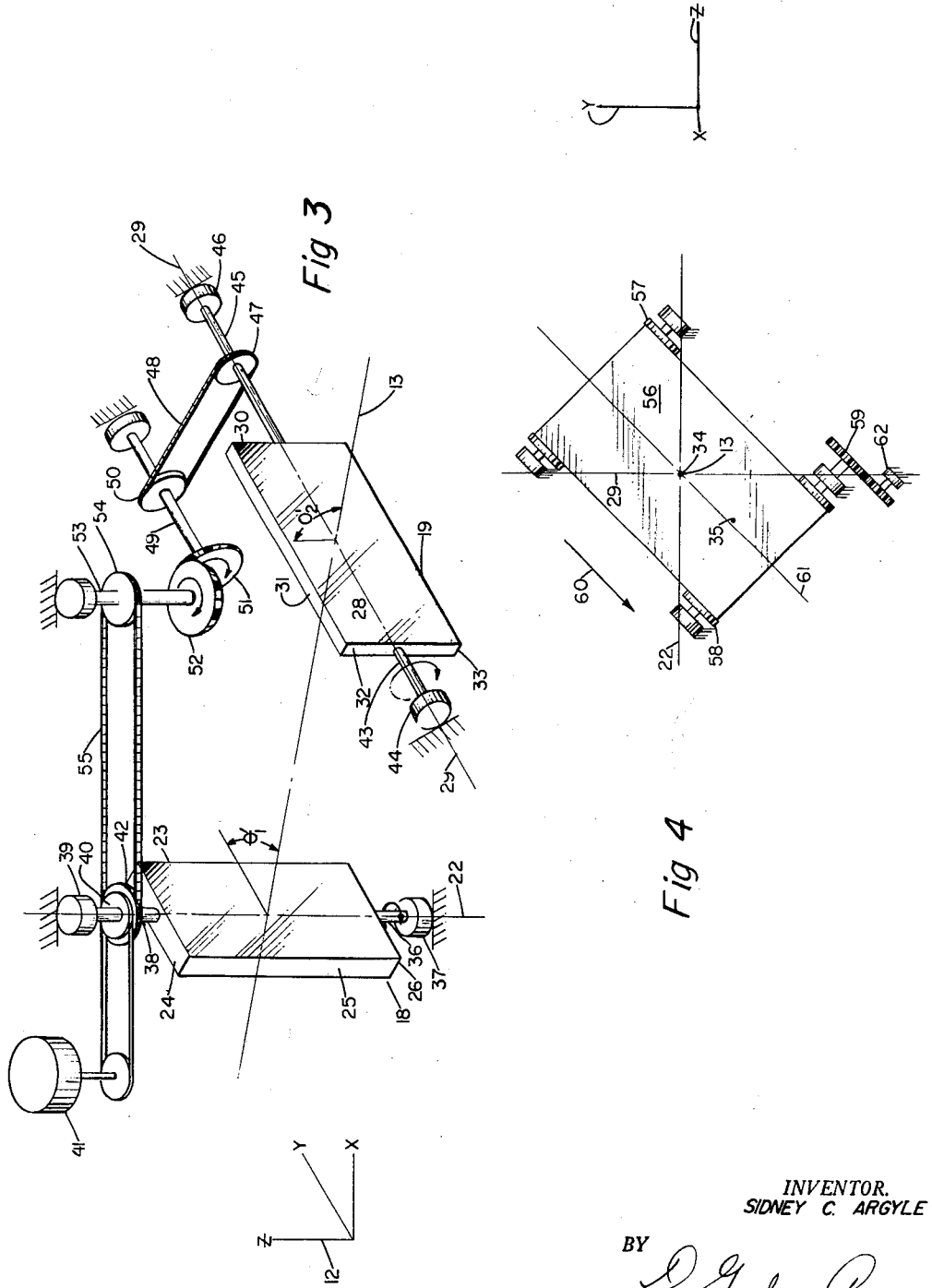
*INVENTOR.*
*SIDNEY C. ARGYLE*
BY
*ATTORNEY*

United States Patent Office

2,868,066
Patented Jan. 13, 1959

2,868,066

OPTICAL RECTIFIER

Sidney C. Argyle, Glendora, Calif., assignor to Aerojet-General Corporation, Azusa, Calif., a corporation of Ohio Application September 9, 1957, Serial No. 682,733

12 Claims. (Cl. 88—16.8)

This invention relates to optical image forming systems and more particularly to such systems which move or displace such an image.

An object of this invention is to enable a moving image of an object to be clearly focussed in a focal plane.

A related object is to produce such a moving image in a camera with a minimum of aberrations.

Optical devices for focussing an image of an object in a focal plane, are well known, as for example in a camera. It is sometimes desirable to move or displace such an image. For example, if a strip of photographic film be moved in a focal plane, the image can be focussed in the moving film, and the film can be exposed to the image while the film is moving, so long as the image focussed on the film is moved at the same rate as the film.

Arrangements have heretofore been proposed for moving the image in such a manner. According to a previous arrangement a transparent plane parallel optical plate has been rotated at a position in the light path between the objective lens and the focal plane. The optical plate refracts the light, and its rotation has caused the image to move accordingly. A difficulty encountered in the use of such a rotating plate has been the introduction of aberrations into the image by reason of the fact that such a plate does not treat all light rays in exactly the same manner in different positions of the plate relative to the optical axis of the system.

In accordance with my present invention, I overcome much of the undesired aberration effect by the provision of a second rotating plate in the optical path of the system.

The second plate has a different axis of rotation from the first plate; and the axes of rotation of the first and second plates are ordinarily perpendicular to each other and the optical axis of the system. The mutual rotations and positions of the first and second plates are such that the introduction of aberrations by either one compensates for aberrations produced by the other.

A feature of the system which I prefer to employ resides in the provision for making the principal ray received from any point in the object field parallel to the optical axis of the system. I have found with such an arrangement wherein the principal ray from object points are caused to be parallel to each other as they are brought to the first of the rotating optical plates, the plates are enabled in concert with each other to move the image in the focal plane without undesirable aberration effect. By such an arrangement the picture image or a series of such images can be focussed on a moving film and moved along with the film; and the images can be made sharp and clear even though the film is moving and even though the camera is moving, which effect of movement is a function of the exposure time.

The foregoing and other features of the invention will be better understood from the following detailed description and the accompanying drawings, of which:

Fig. 3 is a perspective view of part of the system of Fig. 1, particularly showing some additional mechanical element; and Fig. 4 is a view taken at line 4—4 of Fig. 1.

Figure 1:
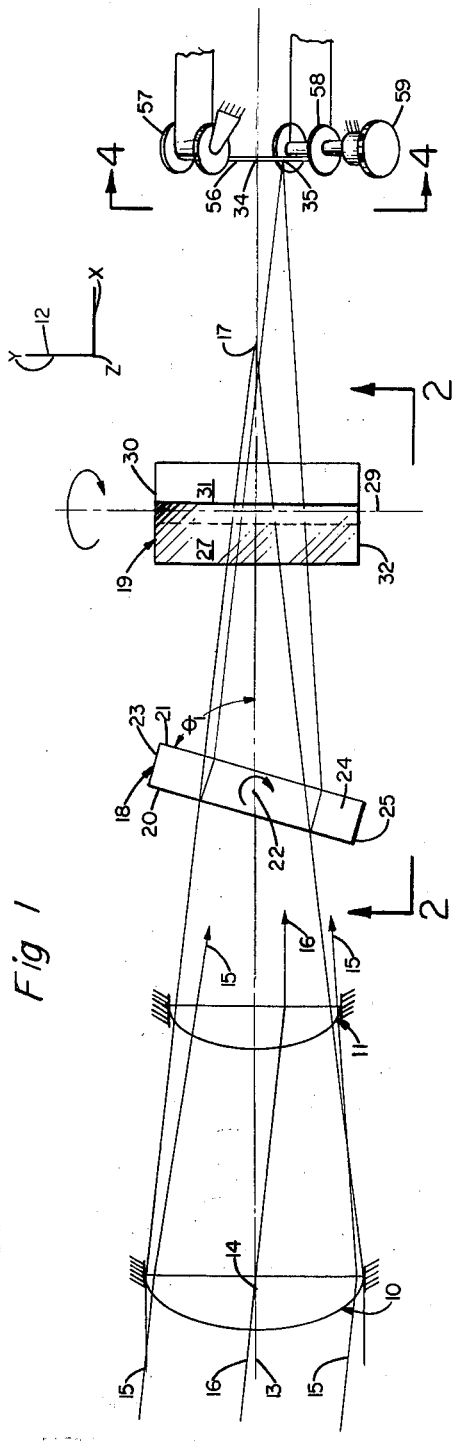
Fig. 1 is a side view showing the optical parts of a system according to this invention.

In Fig. 1, there is shown an optical system having an objective lens 10 of the convergent type. The objective lens 10 is located at the object end, or left end, of the optical system. A second lens 11 located further from the object end is also provided.

A three-dimension reference system 12 is provided in order to relate components in the various views. The $x$ axis is parallel to the central axis 13 of the system, and the $y$ and $z$ axes are mutually perpendicular to the $x$ axis and to each other. The $z$ axis is perpendicular to the plane of Fig. 1.

The two lenses 10 and 11 are disposed on the optical axis 13 of the optical system, which is an imaginary axis disposed in the direction of the $x$ axis and represented by the dashed line in Fig. 1. It is to be understood that in practice, the objective lens 10 and the second lens 11 may conveniently be designed as a unit and that each of these two lenses are ordinarily comprised of several elements as is common in lens design.

Some point objects to the left of the objective lens 10 are located off the optical axis 13. Each one of such non-axial point objects has a principal ray and a plurality of other rays. A principal ray is a ray which passes through the optical center 14 of the objective lens 10. One of such non-axial object points, selected at random for purposes of illustration, emits a bundle of rays 15 represented by the lines shown passing through the edges of the objective lens 10 in Fig. 1. This bundle of rays also has a principal ray represented by line 16 passing through the optical center 14 of the objective lens 10. The rays 15 are converged by the objective lens 10.

The purpose of the lens 11 is to make the principal ray from each object point parallel to the optical axis 13 after passing therethrough. As shown in Fig. 1, the principal ray 16 after passing through lens 11 is parallel to the optical axis 13. Any axial object point has a principal ray which is disposed on the optical axis and therefore the lens 11 does not refract such a principal ray. For any such axial point object, the lenses 10 and 11 would form an image on the optical axis 13 at a focal point 17 located somewhere to the right of the lens 11.

Two plane parallel transparent plates 18 and 19 are located adjacent to the lens 11, between the lens 11 and the focal point 17 for the lenses 10 and 11. The plate 18 has two major sides 20 and 21 which are parallel to one another and to the plate's axis of rotation 22 represented by a dot in Fig. 1. This axis 22 is an imaginary line disposed in the direction of the $z$ axis of the reference coordinate system 12. The major sides 20 and 21 of the plate 18 are connected by four minor sides of which three are shown and identified by the numbers 23, 24 and 25 in Fig. 1. The fourth minor side 26 of the plate 18 is shown in Fig. 2.

Figure 2:
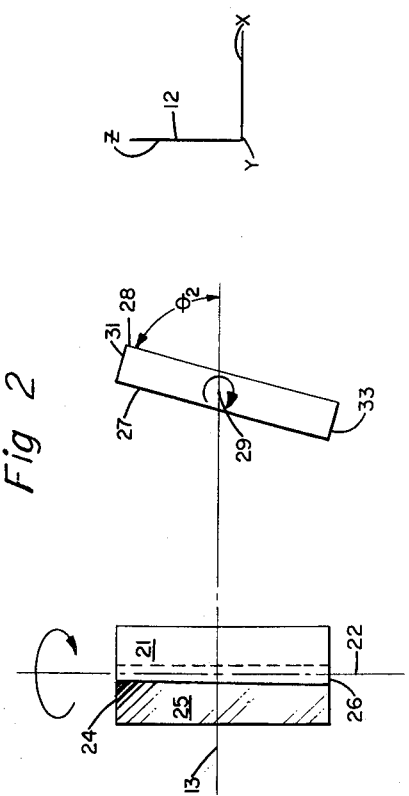
Fig. 2 is a side view taken at line 2—2 of Fig. 1.

The plate 19 has two major sides 27 and 28, as best shown in Fig. 2, which are parallel to one another and to the plate's axis of rotation 29 represented by a dot in Fig. 2. The axis 29 is an imaginary line disposed in the direction of the $y$ axis of the reference coordinate system 12. The major sides 27 and 28 of the plate 19 are connected by four minor sides of which three are shown and identified by the numbers 30, 31 and 32 in Fig. 1. The fourth minor side 33 of the plate 19 is shown in Fig. 2.

The plate 18 and the plate 19 are of the same transparent material and of the same thickness measured between their major sides.

For an axial point object, the lenses 10 and 11 and the plates 18 and 19, provided the plates 18 and 19 are disposed with major surfaces perpendicular to the optical axis 13, would form an image on the optical axis 13 at a different focal point 34 shown in Fig. 1 somewhere to the right of the plate 19 and also to the right of the lenses' focal point 17.

If both of the plates 18 and 19 rotated about their axes 22 and 29 respectively to positions as shown in Figs. 1 and 2, the same point image formerly located at the focal point 34 would be displaced to a new position 35 which is not on the optical axis 13 nor in the plane of Fig. 1. In Fig. 1 the image at the position 35 is disposed downward from the optical axis 13 and behind the plane of Fig. 1.

The axes 22 and 29 are orientated in the directions of the z and y coordinate axes respectively and each intersects the optical axis 13 which is disposed in the direction of the x axis. The axes 22 and 29 are centrally located in the respective plates 18 and 19 and they intersect the optical axis 13 far enough apart to permit rotation of the plates 18 and 19 without interference with one another.

As shown in Fig. 3, there is disposed along the axis of rotation 22 of the plate 18 an axle 36 and a fixed journal 37. The axle 36 is attached to the minor side 26 of the plate 18. An axle 38 is attached to the minor side 24 along the axis of rotation 22 and a fixed journal 39 is provided for the axle 38. The axle 38 is also provided with a pulley 40 which is belt driven from a motor 41. A sprocket 42 for a chain drive is also provided on the axle 38.

There is also shown in Fig. 3, disposed along the axis of rotation 29 of the plate 19 an axle 43 and a fixed journal 44. The axle 43 is attached to the minor side 32 of the plate 19. An axle 45 is attached to the minor side 30 along the axis of rotation 29 and a fixed journal 46 is provided for the axle 45. The axle 45 is also provided with a sprocket 47 for a chain drive. A chain 48, a mounted axle 49, a sprocket 50, a bevel gear 51, a bevel gear 52, a mounted axle 53, a sprocket 54 and a chain 55 provide the mechanical driving means from the plate 19 to the plate 18 which in turn is driven by the common power source which is the motor 41. The mechanical connection between plates provides that when the major surfaces 20 and 21 of the plate 18 make some angle $\theta_1$, with respect to the optical axis 13, as shown in Fig. 1, the major surfaces 27 and 28 of the plate 19 make an equal angle $\theta_2$ with respect to the optical axis 13 as shown in Fig. 2.

In Fig. 3, a rotation of the plate 18 causes movement which decreases the angle $\theta_1'$, and a corresponding rotation of the plate 19 causes movement which decreases the angle $\theta_2'$. The decreased angles are indicated by $\theta_1$ and $\theta_2$ shown in Figs. 1 and 2 respectively. In Fig. 1 from a large source supply, not shown since it is not a part of this invention, there is a movable film 56. The film 56 is located at a right angle to the optical axis 13 at about the focal point 34 obtained for axial objects with the two lenses 10 and 11 and the two transparent plates 18 and 19. The film 56 is exposed at various positions by moving the film 56 at a constant rate over the film roller 57 and the drive roller 58. As shown in Fig. 4, a gear means 59 on the drive roller is rotated by a motor 62 so that the film 56 can be rotated at a suitable film speed. An arrow 60 indicates the direction in which the film 56 is moved. The arrow 60 is at right angles to the optical axis 13 and at 45° from the axes of rotation 22 and 29 of the plates 18 and 19 respectively.

The line 61 in Fig. 4 indicates the locus of an image of a point object. The image locus line 61 is parallel to the direction of the movement of the optical system indicated by the arrow 60. The particular object selected for this demonstration is an image having the locus line 61 which passes through the optical axis 13.

When the optical system is in operation the film 56 is moved in the direction of the arrow 60 shown in Fig. 4. The film 56 is continuously turned to an unexposed portion by means of the gear 59 and the motor 62. The motor 41 is then operated at a constant speed which rotates the two plates 18 and 19 in such a way that the planes of their major surfaces make equal angles with respect to the optical axis 13. The plate 18 has a clockwise rotation in the Fig. 1 view when the plate 19 has a clockwise rotation in the Fig. 2 view. The plates 18 and 19 in the positions of rotation shown in Fig. 3 produce an image on the optical axis 13 at the focal point 34 shown in Fig. 1 and Fig. 4 for an object which is on the optical axis 13. This is the result when the plates 18 and 19 are both perpendicular to the optical axis 13, as shown in Fig. 3.

When the film 56 has moved in the direction of the arrow 60 at a slightly later instant of time, the same axial object considered above now has rays refracted as shown in Fig. 1. This refraction takes place since the plates 18 and 19 in the same instant of time have been rotated at a constant speed so that they now are disposed at angles of equal magnitude as shown in Fig. 1. The same point object has rays which are refracted downward by the plate 18 and to the left by the plate 19 relative to Fig. 4. This same point object, due to the equal refraction of rays of the point object, now forms an image by means of the refracted rays which is located off the optical axis 13 at the focal point 35.

Similarly for the same point object at an earlier instant of time than for the conditions shown in Fig. 3, the plates 18 and 19 would be in positions of rotation preceding the Fig. 3 positions. At these preceding positions of rotation the point object has rays refracted upward by the plate 18 and to the right by the plate 19 relative to Fig. 4. The image formed by these rays at this time is focussed again off the optical axis 13 along the locus line 61.

The plates should be rotated at the constant speed at which the image for the same point object is brought to focus at the same film position even though the film 56 has also moved at a constant speed. The corresponding constant speeds for the plates and film is determined by the speed of movement of the object. Faster moving objects require faster film and plate speeds. Sharp images are produced for non axial objects due to the lens 11 which makes every principal ray passing through the optical center 14 of the lens 10 parallel to the optical axis 13, as shown by the ray 16 in Fig. 1.

Point objects not aligned with the locus line 61 of Fig. 4, but off to either side of the locus line 61 would have point images displaced similar distances during like intervals of time. The result is that such images would be focussed at the same film position on the moving film during the period in each one half a revolution of the plates 18 and 19, when focussing is accomplished even though the film has moved during the interval of such a motion. This results since rays from these non-axial point objects not in alignment with the locus line 61 are also refracted by the plates 18 and 19. Such non-axial point objects would have point image locus lines due to the refraction which would be parallel to the locus line 61 and off to either side. Each point object has a refraction of the rays which form its image, so that the point image formed has a linear transverse displacement. Even though the film has been moved relative to the objective lens 10, the point image because of its linear transverse displacement is focussed at the same position on the moving film when the transparent plates are rotated at a suitable speed for the particular speed of movement of the film in the direction of the arrow 60.

The two transparent plates provide the above linear transverse motion of images in the image plane during the focussing or exposure period for each one-half a revolution of the two plates.

The major sides of the plates 20, 21, 27 and 28 are disposed parallel to the optical axis 13 between each one half a revolution. This is a position intermediate between the end of one period of focus and the beginning of another period of focus.

For these plate positions an image at the film 56 has been discontinued because the image is not focussed at the film position. This is due to the greater thickness in some portions of the optical path of transparent plate material when the transparent plates have their major sides parallel to the optical axis, although it is to be understood that the discontinuity actually starts and stops at some intermediate position between these similar positions.

Focussing on the film would take place over a period of time comprising a small portion of each one-half a revolution. For the focussing period of each one-half a revolution of the transparent plates, a different portion of the moving film is exposed. It is to be understood that if it is desired, synchronized shutters may be provided to prevent unwanted light from reaching the film during the dead time of each one-half a revolution. During this dead time a different film surface is turned for exposure by the gear 59 by the motor 62.

The chief advantage of this invention is the provision of an optical system which provides a linear transverse motion of the image plane of an optical system without introducing large aberration in the optical image. The aberrations introduced by one refracting plate are cancelled by the other refracting plate. Good imagery for non-axial as well as axial object points is provided. This is accomplished by the lens 11. This lens 11 is designed to make each principal ray parallel to the optical axis after having passed therethrough. The optical system may be used to give sharply defined images even though the film and object space are moved relative to the camera. The film is moved at a high rate of speed during exposure and sharply defined images having no appreciable aberrations result. All points in the image plane are swept in a straight line at approximately constant speed across the focal plane.

The transparent plates are light in weight and inexpensive to manufacture. They can be securely mounted and would not become out of adjustment except by extreme impacts.

It will be appreciated that the transparent plates 18 and 19 may have more than two major surfaces each for the purpose of transmitting light. The essential requirement of the plates 18 and 19 is that they act in a certain correspondence of rotation with one another.

I desire that my invention shall not be limited except in accordance with the appended claims and not to the specific embodiment shown and described since persons skilled in the art may devise other forms still within the limitations of the claims.

I claim:

1. An optical system having an optical axis, comprising: an objective lens; a second lens; both of said lenses having optical centers disposed on said optical axis, the said second lens being so disposed and arranged that principal rays from an object point which pass through the said two lenses emerge from the second lens parallel to said optical axis; a pair of refractive means disposed on said optical axis, said pair of lenses and pair of refractive means having a focal plane, said pair of refractive means being disposed between said second lens and said focal plane, there being a pair of opposed parallel major light transmitting surfaces on each of said refractive means, said pair of refractive means each having an axis of rotation, said axes being disposed in directions mutually perpendicular to each other and to said optical axis, said axes of rotation being displaced from one another in the direction of said optical axis so as to permit rotation of said pair of refractive means without interference with one another; means for rotating said refractive means so that angles made by said optical axis and said major light transmitting surfaces of each of said refractive means are of equal magnitude, said means for rotating said refractive means being adjustable to a constant speed, thereby providing a linear motion of image points in the image plane which motion is transverse to said optical axis and which results from refraction of light rays from an object which traverse said optical system while said pair of refractive means are rotated.

2. Apparatus according to claim 1 in which said pair of major light transmitting surfaces of one of said refractive means are disposed the same distance apart as said pair of major light transmitting surfaces of the other of said refractive means, said pair of refractive means being made of the same transparent material.

3. Apparatus according to claim 1 in which said refractive means each have a plurality of pairs of major light transmitting surfaces.

4. Apparatus according to claim 1 in which said refractive means comprise a pair of flat plates, each having one pair of major light transmitting surfaces.

5. Apparatus according to claim 1 in which said means for rotating said pair of refractive means comprises a mechanical coupling means for coupling said refractive means in correspondence with one another, and a drive means for rotating said pair of mechanically coupled refractive means in correspondence with one another.

6. An optical system having an optical axis, comprising: an objective lens, a second lens, both of said lenses having optical centers disposed on said optical axis, the said second lens being so disposed and arranged that principal rays from an object point which pass through the said two lenses emerge from the second lens parallel to said optical axis; a pair of refractive means disposed on said optical axis, said pair of lenses and pair of refractive means having a focal plane, said pair of refractive means being disposed between said second lens and said focal plane, there being a pair of opposed parallel major light transmitting surfaces on each of said refractive means, said pair of refractive means each having an axis of rotation, said axes of rotation being disposed in directions mutually perpendicular to each other and to said optical axis, said axes of rotation being displaced from one another in the direction of said optical axis so as to permit rotation of said pair of refractive means without interference with one another; a pair of axles attached to each of said refractive means, said pair of axles for each of said refractive means being disposed along said axis of rotation for said refractive means, one axle being attached on each side of said refractive means; a plurality of fixed journals provided for said axles to rotate in; a sprocket on an axle for one of said refractive means, a second sprocket on an axle for the other of said refractive means; chain means on each of said sprockets for driving in rotation said sprockets and axles and refractive means; mechanical coupling means for coupling said chain means, whereby said mechanical coupling means and said chain means are so disposed and arranged that angles made by said optical axis and said major light transmitting surfaces of each of said refractive means are of equal magnitude; means for rotating said mechanical coupling means and said chain means, said means for rotating being adjustable to a constant speed, whereby said mechanical coupling means, said chain means, said sprockets, said axles and said refractive means are rotated at constant speed, thereby providing a linear motion of image points in the image plane which motion is transverse to said optical axis and which results from refraction of light rays from an object which traverse said optical system while said pair of refractive means are rotated.

7. Apparatus according to claim 6 in which said mechanical coupling means for coupling said chain means for each of said sprockets comprise: two additional axles each mounted in a journal; two bevel gears each mounted on one of said two axles; two additional sprockets, each of which is mounted on one of said two additional axles, said bevel gears being in mechanical contact with one of the sprockets for one of said axles for the refractive means and also in mechanical contact with one of the sprockets on an axle having a bevel gear, said chain means being in mechanical contact with the other one of the sprockets for the other of said axles for the refractive means and also in mechanical contact with the other of the sprockets on the other axle having a bevel gear, whereby said means for rotating said mechanical coupling means and said chain means causes rotation of said two additional axles having bevel gears in unison, said bevel gears being in mechanical contact with one another.

8. Apparatus according to claim 6 in which said means for rotating said mechanical coupling means and said chain means comprises: a pulley attached to one of said axles for a refractive means; a motor for driving said pulley; and a belt for attachment of said motor to said pulley.

9. Apparatus according to claim 6 in which said journals for said two additional axles are fixed in position with respect to one another and with respect to the axles for said refractive means.

10. An optical system having an optical axis comprising: an objective lens; a second lens, both of said lenses having optical centers disposed on said optical axis, the said second lens being so disposed and arranged that principal rays from an object point which pass through the said two lenses emerge from the second lens parallel to said optical axis; a pair of refractive means, said pair of refractive means being disposed on said optical axis, said pair of lenses and pair of refractive means having a focal plane, said pair of refractive means being disposed between said second lens and said focal plane, there being a pair of opposed parallel major light transmitting surfaces on each of said refractive means, said pair of refractive means each having an axis of rotation, said axes of rotation being disposed in directions mutually perpendicular to each other and to said optical axis, said axes of rotation being displaced from one another in the direction of said optical axis so as to permit rotation of said pair of refractive means without interference with one another; a film for recording image points formed by rays traversing said optical system, said film being disposed in said focal plane perpendicular to said optical axis; a means for moving said film across said focal plane at a substantially constant rate of speed; a pair of axles attached to each of said refractive means, said pair of axles for each of said refractive means being disposed along said axis of rotation for said refractive means, one axle being attached on each side of said refractive means, a plurality of fixed journals provided for said axles to rotate in; a sprocket on an axle for one of said refractive means; a second sprocket on an axle for the other of said refractive means; chain means on each of said sprockets for driving in rotation said sprockets and axles and refractive means; mechanical coupling means for coupling said chain means, whereby said mechanical coupling means and said chain means are so disposed and arranged that angles made by said optical axis and said major light transmitting surfaces of each of said refractive means are of equal magnitude; means for rotating said mechanical coupling means and said chain means, said means for rotating being adjustable to a constant speed, whereby said mechanical coupling means, said chain means, said sprockets, said axles and said refractive means are rotated, thereby providing a linear motion of image points in the image plane which motion is transverse to said optical axis and which results from refraction of light rays from an object which traverse said optical system while said pair of refractive plates are rotated.

11. Apparatus according to claim 10 in which said film for recording image points moves in a direction at substantially 45 degrees to the directions of each of said axes of rotation.

12. Apparatus according to claim 10 in which said means for moving said film comprises means for driving said film and a motive means in mechanical communication with said gear means, said motive means being adjustable for various rates of speed.

No references cited.